H. H. ROBERTSON.
Wheel Plow.
No. 304. A. I. Patented Nov. 27, 1860.
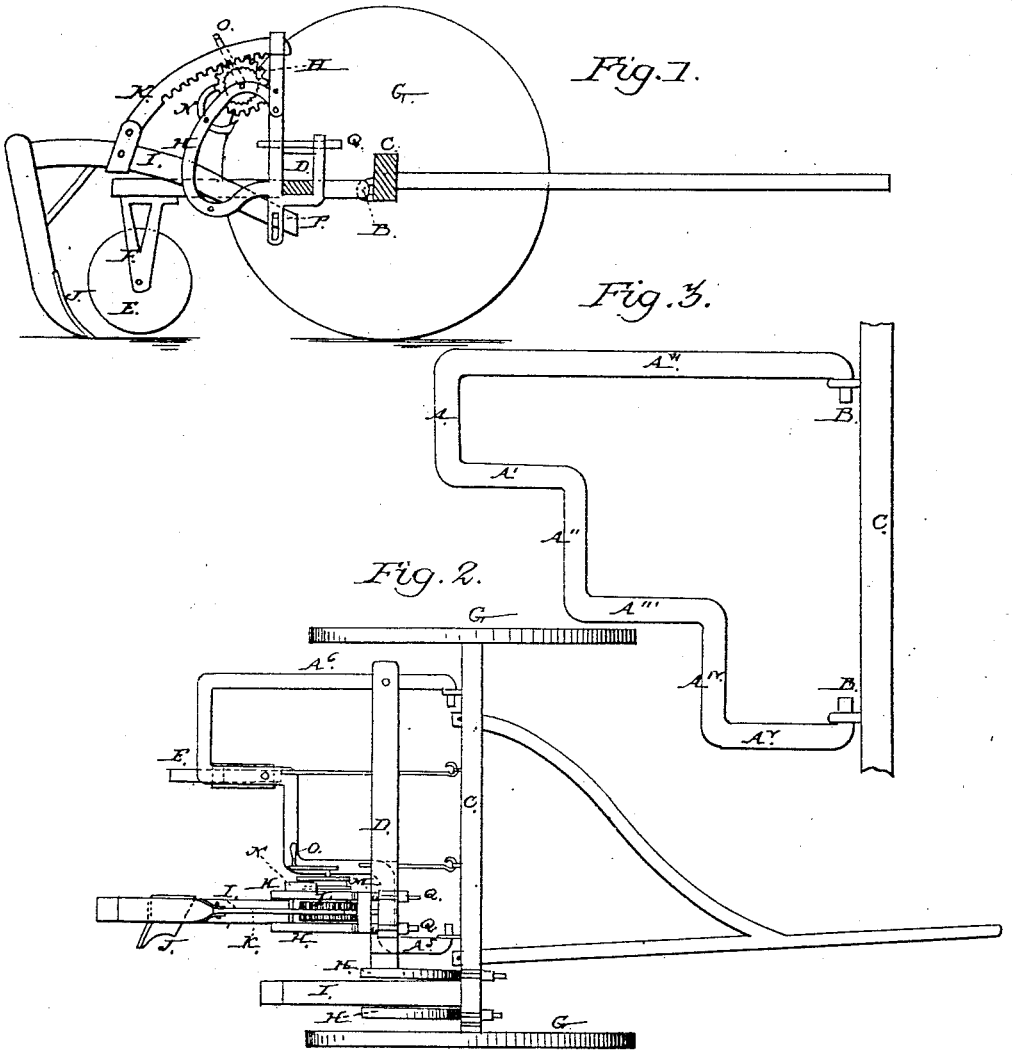
Witnesses:
James H. Gridley
E. M. Bendre
Inventor:
Munn & Co Attorneys
for H. H. Robertson
N. PETERS, PHOTO-LITHOGRAPHER, WASHINGTON, D. C.

UNITED STATES PATENT OFFICE.

HENRY H. ROBERTSON, OF KINGSTON, MISSOURI.

IMPROVEMENT IN PLOWS.

Specification forming part of Letters Patent No. 29,104, dated July 10, 1860; Additional Improvement No. 304, dated November 27, 1860.

*To all whom it may concern:*

Be it known that I, H. H. ROBERTSON, of Kingston, in the county of Caldwell and State of Missouri, have invented a new and useful Improvement in Plows; and I do hereby declare that the following is a full, clear, and exact description of the same, reference being had to the accompanying drawings, forming a part of this specification, in which—

Figure 1 represents a vertical longitudinal section; Fig. 2, a top view of the machine, and Fig. 3 a plan of the hinged frame on an enlarged scale.

Similar letters of reference in each of the several figures indicate corresponding parts.

The nature of my invention consists in the arrangement of a hinged frame, consisting of a succession of angles, in combination with the beams of an equal number of plows, all constructed and operating substantially as hereinafter set forth.

To enable others skilled in the art to make and use my invention, I will proceed to describe its construction and operation.

The angular frame forming the subject of this invention is intended to be used in combination with the devices previously patented by me for raising and lowering plow-beams and plows. These devices are represented in the drawings at Figs. 1 and 2.

The beam I of the plow J is hinged at its forward end, P, to a stationary frame, H. The rear end of a toothed segment of a circle, K, is hung to the plow-beam, near the rear end of the latter, as seen in Fig. 1. A cog-wheel, L, taking into the teeth of the arc K, has its bearings in the frame H, and can be operated by a crank, O, so as to raise or lower the rear end of the plow-beam and the plow. A ratchet-wheel, M, and pawl N serve to secure the gearing, plow-beam, and plow in any desired position.

The devices thus far described form the subject of Letters Patent already obtained by me.

The improvement forming the subject of my present application for Letters Patent is intended to facilitate the attachment of a number of plows—gang plows or cultivators—each of them provided with the above-described devices for raising and lowering the beams and plows to the axle of the driving-wheels. Such gang plows or cultivators are always placed in an oblique line instead of in a line at right angles to the line of draft, so that the last plow will be considerably farther behind the axle of the driving-wheels than the first one.

In my above-described devices it is an object to have the frame H and gearing for adjusting the plow-beams not too far distant from the rear end of the plow-beam. It will be understood that the farther the plow-beam extends back of the frame H, which holds and serves as a guide for the plow-beam, the more will the rear end of the beam and the plow be exposed to yield laterally. To obviate this difficulty and to secure all the gang plows or cultivators properly, however far they may extend back of the axle C of the driving-wheels G G, I construct a frame consisting of a succession of angles, A A′ $A^2$ $A^3$ $A^4$ $A^5$, as many angles as there are plows to be employed. This frame is hinged to the axle C at B B. The distance of each of the angles behind the preceding one is equal to the intended distance between each two of the plows. Thus it will be seen a series of plow-beams, I, and of devices H K L M, can be attached to the parts A $A^2$ $A^4$ of the frame, all the plow-beams being of equal length and all the devices H K L M being of the same size. In this manner all the plows will be equally well secured, each one of them being at the same distance from the point where its beam is attached to the angular frame. The devices H K L M being all of the same size, the same castings can be used for their construction.

A wooden bar, D, may be used in combination with each angle of the frame, as seen in Figs. 1 and 2, to facilitate the securing of the frames H to the angles, which is done by means of wedges, Q.

The drawings represent only one of the plows J, but it will be understood that as many plows can be attached to the angular frame as there are angles.

The frame is hinged to the axle at B B and supported by a caster-wheel, E, near its rear end, so that the frame, with the plows, may adapt itself to the inequalities of the ground over which it travels.

What I claim as my invention, and desire to secure by Letters Patent, is—

The arrangement of a hinged frame consisting of a succession of angles, A $A'$ $A^2$ $A^3$ $A^4$ $A^5$, in combination with the beams I of an equal number of plows, all constructed and operating substantially as set forth.

HENRY H. ROBERTSON.

Witnesses:
LEMUEL DUNN,
ROBT. G. MURRAY.